(12) United States Patent
Tang et al.

(10) Patent No.: US 10,502,506 B2
(45) Date of Patent: Dec. 10, 2019

(54) LIQUID DRAIN VALVE FOR CHARGE AIR COOLER

(71) Applicants: Jing Tang, Canton, MI (US); Emanuele Palma, Beverly Hills, MI (US); Mark O'Donovan, Plymouth, MI (US)

(72) Inventors: Jing Tang, Canton, MI (US); Emanuele Palma, Beverly Hills, MI (US); Mark O'Donovan, Plymouth, MI (US)

(73) Assignee: FCA US LLC, Auburn Hills, MI (US)

( * ) Notice: Subject to any disclaimer, the term of this patent is extended or adjusted under 35 U.S.C. 154(b) by 432 days.

(21) Appl. No.: 15/352,744

(22) Filed: Nov. 16, 2016

(65) Prior Publication Data

US 2018/0135925 A1    May 17, 2018

(51) Int. Cl.
*F28F 17/00* (2006.01)
*F02B 29/04* (2006.01)
*F28D 21/00* (2006.01)

(52) U.S. Cl.
CPC ........ *F28F 17/005* (2013.01); *F02B 29/0468* (2013.01); *F28D 2021/0082* (2013.01)

(58) Field of Classification Search
CPC ..... F28F 17/00; F28F 17/005; F02B 29/0468; F28D 2021/0082; Y10T 137/304; Y10T 137/7869
USPC ........................................................ 123/563
See application file for complete search history.

(56) References Cited

U.S. PATENT DOCUMENTS

| 4,050,285 A | * | 9/1977 | Bosch | B21J 15/105 |
| | | | | 137/517 |
| 4,627,460 A | * | 12/1986 | Eising | F01N 3/005 |
| | | | | 137/192 |
| 5,117,799 A | * | 6/1992 | Suzuki | F02B 39/04 |
| | | | | 123/561 |

(Continued)

FOREIGN PATENT DOCUMENTS

| DE | 102013005847 A1 * | 10/2014 | ......... F02B 29/0468 |
| EP | 2161430 A1 | 3/2010 | |

(Continued)

OTHER PUBLICATIONS

DE 102013005847 English Translation—Hein, Thomas, Pub Oct. 2014.*

(Continued)

*Primary Examiner* — Jason D Shanske
*Assistant Examiner* — Jessica L Kebea
(74) *Attorney, Agent, or Firm* — Ralph E Smith

(57) ABSTRACT

A liquid drain valve assembly for a charge air cooler includes a valve housing configured to couple to the charge air cooler, the valve housing having a condensate inlet configured to receive condensate from the charge air cooler, and a condensate outlet. A valve is disposed within the valve housing. The valve includes a diaphragm seated against an inner wall of the valve housing and movable between a first position enabling condensate to flow past the diaphragm and out the condensate outlet to selectively drain condensate from the charge air cooler when the charge air cooler is not in a boosted condition, and a second position preventing condensate flow out the condensate outlet when the charge air cooler is in a boosted condition to thereby isolate the charge air cooler from the atmosphere.

19 Claims, 3 Drawing Sheets

(56) References Cited

U.S. PATENT DOCUMENTS

| | | | |
|---|---|---|---|
| 8,371,119 B2 | 2/2013 | Durand et al. | |
| 9,422,855 B2 | 8/2016 | Basile et al. | |
| 9,638,094 B2* | 5/2017 | Cardwell | F02B 29/0468 |
| 2007/0181105 A1* | 8/2007 | Bazika | F02B 29/0462 |
| | | | 123/563 |
| 2008/0302327 A1 | 12/2008 | Dahl et al. | |
| 2009/0020079 A1* | 1/2009 | Muller | F01P 7/165 |
| | | | 123/41.1 |
| 2014/0048048 A1 | 2/2014 | Glugla et al. | |
| 2014/0158096 A1 | 6/2014 | Leone et al. | |
| 2014/0290630 A1 | 10/2014 | Pursifull | |
| 2015/0167539 A1 | 6/2015 | Basile et al. | |
| 2015/0285128 A1 | 10/2015 | Cardwell et al. | |
| 2016/0223098 A1* | 8/2016 | McAuliffe | F16K 15/144 |

FOREIGN PATENT DOCUMENTS

| | | | | |
|---|---|---|---|---|
| JP | 2001182542 A | * | 7/2001 | F02B 29/0468 |
| JP | 2002349273 A | * | 12/2002 | F02B 29/0468 |

OTHER PUBLICATIONS

JP 2002349273 Englsih Translation—Kawaski, Shuji, Pub Dec. 2002.*

English Abract for European Publication No. EP2161430A1 acquired from Espacenet.com, Oct. 11, 2016.

* cited by examiner

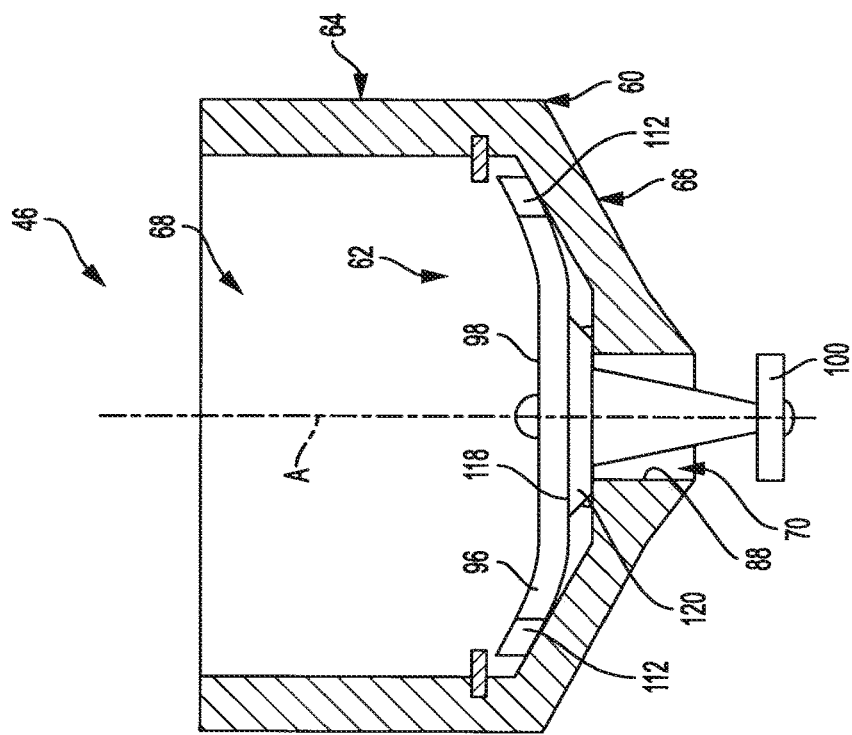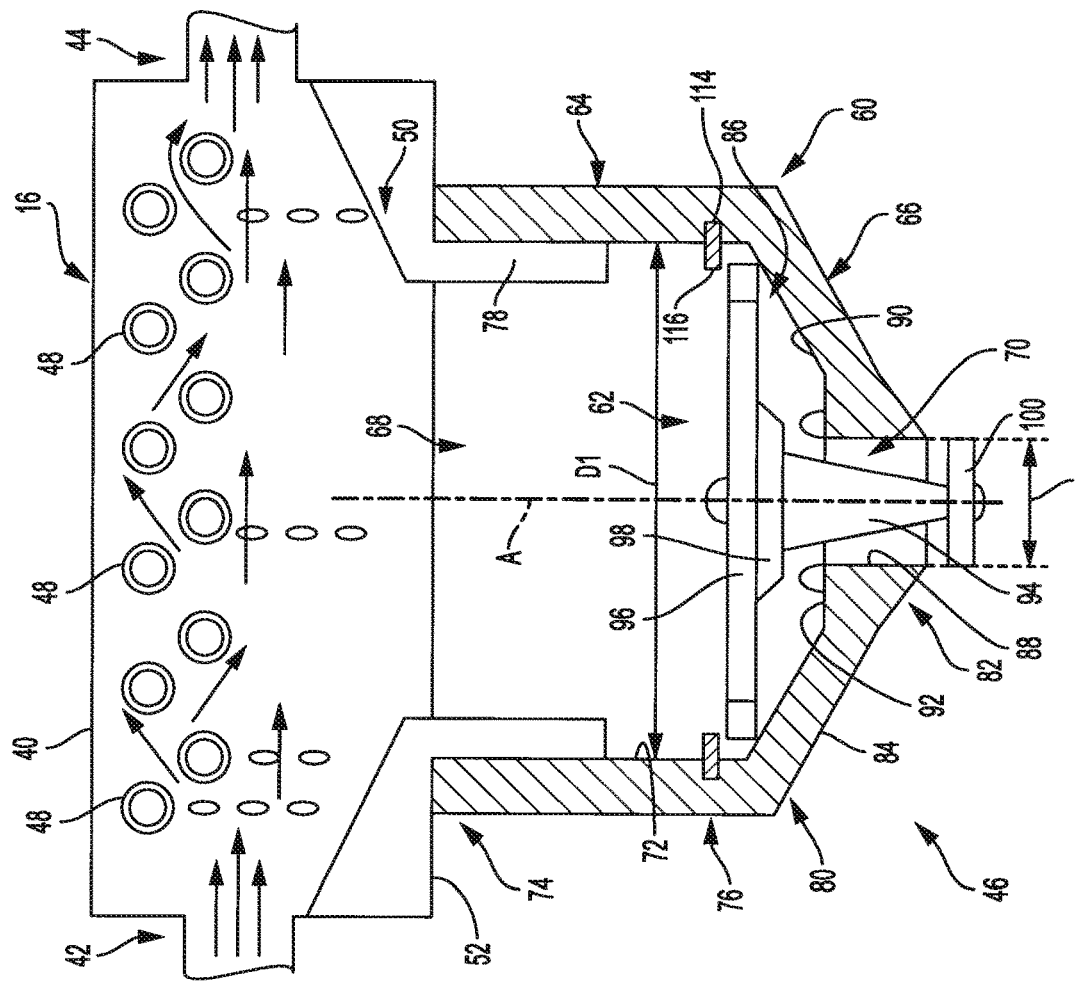

LIQUID DRAIN VALVE FOR CHARGE AIR COOLER

FIELD

The present application relates generally to vehicle charge air coolers, and more particularly, to a liquid drain valve for a vehicle charge air cooler.

BACKGROUND

Some internal combustion engines include a turbocharger or supercharger configured to compress ambient air in order to increase power. Compressing the ambient air causes an increase in its air temperature, resulting in a decrease in engine power due to the intake of high temperature air. In order to cool the high temperature air, an intercooler or charge air cooler is often utilized between the turbocharger/supercharger and an intake manifold of the engine. By reducing the temperature of the ambient air, its density is increased thereby allowing the engine to produce more power.

However, as the high temperature air passes through the charge air cooler and is cooled, liquid condensate may form and collect inside the charge air cooler under certain conditions. There is an opportunity for the collected condensate to subsequently freeze inside the charge air cooler in low temperature ambient conditions, and/or to accumulate chemical impurities that may potentially corrode the charge air cooler. Moreover, when engine torque is increased during acceleration or other similar conditions, the resulting increased mass airflow operates to potentially draw the collected condensate into an intake manifold or engine, which presents an opportunity for the condensate to freeze or increase the chance of engine misfire and combustion instability. Accordingly, while conventional charge air cooler systems work well for their intended purpose, there remains a need for improvement in the art.

SUMMARY

In accordance with an example aspect of the invention, a liquid drain valve assembly for a charge air cooler is provided. In one exemplary implementation, the liquid drain valve assembly includes a valve housing configured to couple to the charge air cooler, the valve housing having a condensate inlet configured to receive condensate from the charge air cooler, and a condensate outlet. A valve is disposed within the valve housing. The valve includes a diaphragm seated against an inner wall of the valve housing and movable between a first position enabling condensate to flow past the diaphragm and out the condensate outlet to selectively drain condensate from the charge air cooler when the charge air cooler is not in a boosted condition, and a second position preventing condensate flow out the condensate outlet when the charge air cooler is in a boosted condition to thereby isolate the charge air cooler from the atmosphere.

In addition to the foregoing, the described liquid drain valve assembly may include one or more of the following features: wherein the valve further includes a valve seat configured to selectively seal the condensate outlet; wherein the valve further includes a guide rod at least partially extending through the condensate outlet, the diaphragm and the valve seat coupled to a first end of the guide rod; wherein the valve further comprises a stopper coupled to a second end of the guide rod, the stopper disposed outside of the valve housing and configured to limit vertical movement of the guide rod; wherein the valve housing includes a wall defining a seating surface, the valve seat configured to seat against the seating surface to seal the condensate outlet; wherein the inner wall is tapered and the diaphragm includes a perimeter seated on the tapered inner wall of the valve housing, and a plurality of condensate ports formed in the perimeter and configured to allow condensate to flow past the diaphragm to the condensate outlet; wherein the plurality of condensate ports formed in the diaphragm perimeter includes four condensate ports, each condensate port formed in one quadrant of the diaphragm; wherein the valve housing includes an inner wall having a groove formed therein, and a ring disposed in the groove configured to limit vertical deflection of an outer edge of the diaphragm; and wherein the valve housing includes a cylindrical upper portion and a frustoconical lower portion, the cylindrical upper portion configured to couple to the charge air cooler.

In accordance with another example aspect of the invention, a vehicle is provided. The vehicle includes, in one exemplary implementation, an internal combustion engine, an air intake conduit configured to supply air to the internal combustion engine, a charger fluidly coupled to the air intake conduit and configured to selectively supply compressed charge air to the engine via the air intake conduit during a boosted condition, and a charge air cooler coupled to the air intake conduit and configured to receive the compressed charge air, the charge air cooler configured to cool the compressed charge air before the compressed charge air is supplied to the engine. A liquid drain valve assembly is coupled to the charge air cooler and configured to selectively drain condensate from the charge air cooler. The liquid drain valve assembly includes a valve housing coupled to the charge air cooler, the valve housing having a condensate inlet configured to receive condensate from the charge air cooler, and a condensate outlet. A valve is disposed within the valve housing, the valve including a diaphragm seated against an inner wall of the valve housing and movable between a first position enabling condensate to flow past the diaphragm and out the condensate outlet when the charge air cooler is not in the boosted condition, and a second position preventing condensate flow out the condensate outlet when the charge air cooler is in the boosted condition to thereby isolate the charge air cooler from the atmosphere.

In addition to the foregoing, the described vehicle may include one or more of the following features: wherein the valve housing includes a threaded inner surface configured to be threadably received by a threaded flange extending from the charge air cooler; wherein the charge air cooler includes a plurality of coolant passages configured to receive a coolant, the coolant passages configured to cool the compressed charge air passing thereby; wherein the valve further includes a valve seat configured to selectively seal the condensate outlet; wherein the valve further includes a guide rod at least partially extending through the condensate outlet, the diaphragm and the valve seat coupled to a first end of the guide rod; wherein the valve further comprises a stopper coupled to a second end of the guide rod, the stopper disposed outside of the valve housing and configured to limit vertical movement of the guide rod; wherein the valve housing includes a wall defining a seating surface, the valve seat configured to seat against the seating surface to seal the condensate outlet; wherein the inner wall is tapered and the diaphragm includes a perimeter seated on the tapered inner wall of the valve housing, and a plurality of condensate ports formed in the perimeter and configured to allow condensate to flow past the diaphragm to the condensate outlet; wherein the valve housing includes an inner wall having a groove formed therein, and a ring disposed in the groove configured to limit vertical deflection of an edge of the diaphragm; and wherein the valve housing includes a cylindrical upper portion and a frustoconical lower portion, the cylindrical upper portion configured to couple to the charge air cooler.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a cross-sectional view of an example charge air cooler and a liquid drain valve assembly in an open position, in accordance with the principles of the present disclosure;

FIG. 3 is a cross-sectional view of the liquid drain valve assembly in a closed position, in accordance with the principles of the present disclosure;

Figure 1:
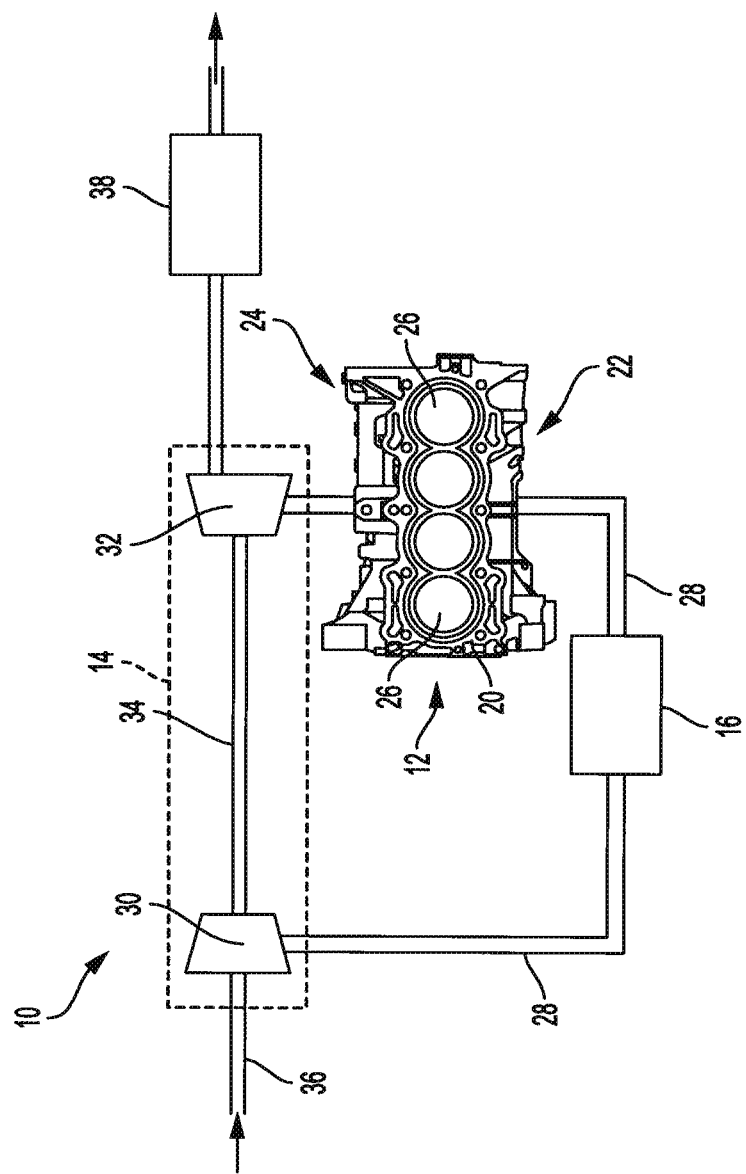
FIG. 1 is a schematic illustration of an example engine and air intake system, in accordance with the principles of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure

DESCRIPTION

With reference to FIG. 1, an example internal combustion engine system 10 is illustrated in accordance with one example of the present disclosure. The internal combustion engine system 10 generally includes an internal combustion engine 12, a charger 14, and an intercooler or charge air cooler 16. Engine 12 includes an engine block 20 having an intake manifold 22, an exhaust manifold 24, and a plurality of cylinders 26 configured to combust a mixture of air and fuel therein. Intake manifold 22 is in fluid communication with cylinders 26 and is configured to provide air from an air intake conduit 28 to the engine 12. Exhaust manifold 24 is in fluid communication with cylinders 26 and is configured to receive exhaust gas therefrom.

In the illustrated example, charger 14 is a turbocharger. However, it will be appreciated that charger 14 may be a supercharger or any similar device configured to compress intake air supplied to engine 12. As shown, turbocharger 14 generally includes a compressor 30 coupled to a turbine 32 via a shaft 34. As is well known, exhaust gas from engine 12 rotates turbine 32, which operates compressor 30 (via shaft 34) to compress air drawn through an air inlet 36. The compressed charge air is then supplied through air intake conduit 28 to charge air cooler 16, where the hot compressed charge air is subsequently cooled in direct or indirect heat exchange with a coolant. The cooled charge air is subsequently supplied to engine 12 via intake manifold 22 where it is mixed with fuel and combusted in cylinders 26. The resulting exhaust gas is exhausted via exhaust manifold 24 to turbine 32 and eventually to an exhaust gas treatment system 38.

With further reference to FIG. 2, in the example embodiment, charge air cooler 16 generally includes a housing 40 having an air inlet 42, an air outlet 44, and a liquid drain valve assembly 46. Air inlet 42 is configured to receive compressed air from turbocharger 14, and the compressed air is subsequently passed over a plurality of coolant passages 48, which receive a flow of coolant (e.g., air, water, refrigerant) therein. The coolant cools the hot compressed air, and the resulting cooled compressed air is then directed through air outlet 44 toward intake manifold 22 and engine 12.

In some cases, moisture contained in the compressed air is condensed during the cooling process and is directed by gravity toward a reservoir 50 disposed at a lower portion of housing 40 such that the condensate from the compressed air can be collected. As shown in FIG. 2, liquid drain valve assembly 46 is coupled to the housing 40 proximate reservoir 50 and is configured to selectively drain the condensate from charge air cooler 16. In the example embodiment, liquid drain valve assembly 46 is threadably coupled to an underside 52 of housing 40. As such, liquid drain valve assembly 46 can be quickly assembled to charge air cooler 16 or removed therefrom for replacement or servicing.

With reference to FIGS. 2-5, liquid drain valve assembly 46 generally includes a valve housing 60 and a valve 62 disposed therein. Valve housing 60 includes a cylindrical or generally cylindrical upper portion 64, a frustoconical or generally frustoconical lower portion 66, a condensate inlet 68, and a condensate outlet 70.

In the illustrated example, valve housing upper portion 64 includes an inner wall 72, an open upper end 74, and a lower end 76. Inner wall 72 is threaded and configured to threadably couple to a threaded flange 78 extending downwardly from charge air cooler housing 40 (see FIG. 2). Open upper end 74 at least partially defines condensate inlet 68 and is configured to fluidly couple to reservoir 50 to receive condensate therefrom. Lower end 76 is coupled to the valve lower portion 66. In the example embodiment, upper portion 64 and lower portion 66 are integrally formed. However, upper portion 64 and lower portion 66 may be formed as separate components and subsequently coupled by any suitable means (e.g., welding).

In the example embodiment, valve housing lower portion 66 includes an upper end 80, a lower end 82, and a tapered sidewall 84 extending therebetween. Upper end 80 is coupled to valve upper portion 64 and defines an opening 86 having a diameter 'D1'. Lower end 82 includes an opening 88 having a diameter 'D2' and defining condensate outlet 70. In the illustrated embodiment, diameter 'D1' is larger than diameter 'D2'. Tapered sidewall 84 includes a tapered inner surface 90 and a seating surface 92. Tapered inner surface 90 is configured to support and/or seal or partially seal with valve 62, and seating surface 92 is configured to provide a seating surface for valve 62, as described herein.

In the example embodiment, valve 62 is at least partially disposed within valve housing 60 and is configured to move between an open position (FIG. 2) and a closed position (FIG. 3). Valve 62 is configured to be in the open position when the engine 12 is not boosted (i.e., charger 14 is not providing compressed air to charge air cooler 16), and in the closed position when the engine 12 is in a boosted state (i.e., charger 14 is providing compressed air to charge air cooler 16).

As shown in FIGS. 2-5, valve 62 generally includes a guide rod 94, a diaphragm 96, a valve seat 98, and a stopper 100. Guide rod 94 extends along a longitudinal axis 'A' and includes a first end 102 and an opposite second end 104. First end 102 is coupled to diaphragm 96 and valve seat 98, and second end 104 is coupled to stopper 100 such that guide rod 94 supports diaphragm 96, valve seat 98, and stopper 100 as valve 62 moves between the open position (FIG. 2) and the closed position (FIG. 3).

Figure 5:
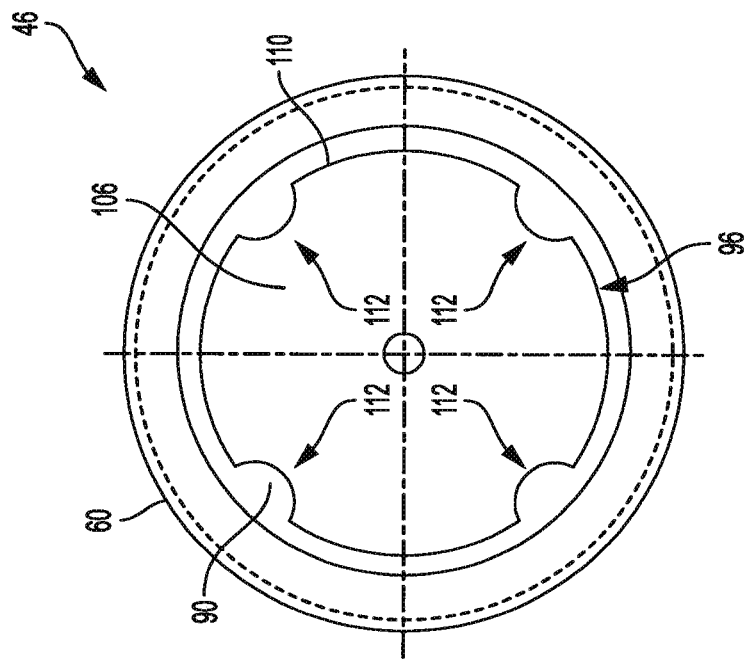
FIG. 5 is a top view of the portion of the liquid drain valve assembly shown in FIG. 4.
Figure 4:
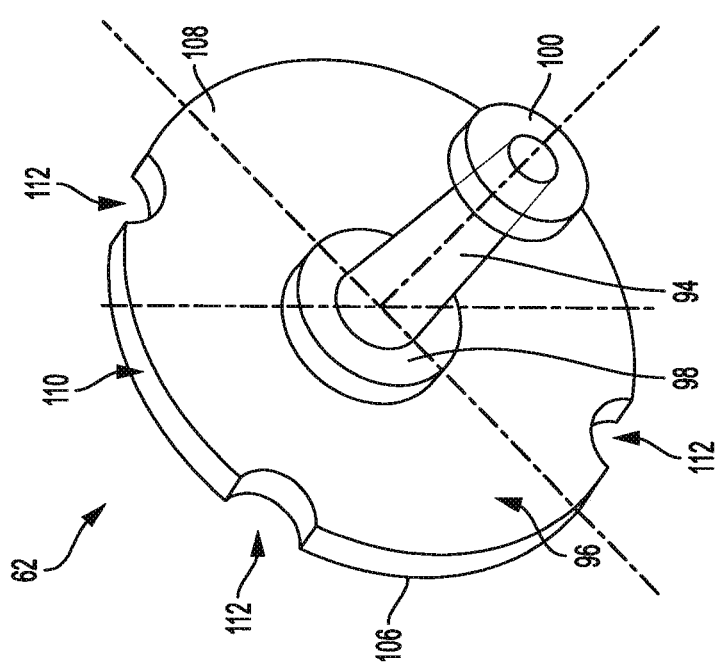
FIG. 4 is a bottom perspective view of a portion of the liquid drain valve assembly shown in FIG. 2.

In the example embodiment shown in FIGS. 4 and 5, diaphragm 96 is generally circular and includes an upper surface 106, a lower surface 108, and an outer edge or perimeter 110 having a plurality of notches or condensate ports 112 formed therein. As shown in FIG. 2, in the valve open position, diaphragm 96 is flat or substantially flat and only perimeter 110 rests against tapered inner surface 90, thereby allowing collected condensate to drain out of the charge air cooler 16 through condensate ports 112 and condensate outlet 70. However, in the valve closed position shown in FIG. 3, diaphragm 96 is forced downward by the boost pressure in charge air cooler 16 such that lower surface 108 is forced against inner surface 90 thereby sealing or partially sealing condensate ports 112 and preventing further draining of the condensate through outlet 70.

As shown in the illustrated example, diaphragm 96 is trimmed symmetrically in quadrants with condensate ports 112 in the form of four partial round holes to reduce stress concentration. However, it will be appreciated that condensate ports may have any suitable shape or number that enables valve assembly 46 to function as described herein. Moreover, the size of condensate ports 112 may be varied to control the deflection of diaphragm 96 during boost conditions. In one example, condensate ports 112 are sized and shaped such that valve 62 seals condensate outlet 70 if the pressure inside valve housing 60 is greater than the ambient pressure outside valve housing 60, and allows accumulated condensate to pass through ports 112 when the pressure in valve housing 60 reaches or approaches the ambient pressure outside valve housing 60. Additionally, valve housing inner wall 72 may include a groove or channel 114 configured to receive an annular ring 116 (FIG. 2) configured to limit the vertical movement of diaphragm 96 and hold diaphragm 96 in position without limiting deflection of diaphragm 96.

In one example, diaphragm 96 is fabricated from an elastic material such as a thin sheet of stainless steel or a synthetic material. Diaphragm 96 remains elastic in a range of temperatures between approximately −40° C. and approximately 85° C. or between −40° C. and 85° C. Moreover, diaphragm 96 may be fabricated from a high durability and anti-corrosive material.

Valve seat 98 is coupled to guide rod first end 102 and includes an upper side 118 and a lower side 120. Upper side is disposed against diaphragm lower surface 108, and lower side 116 is configured to be selectively disposed against seating surface 92 to thereby seal condensate outlet 70. As such, valve seat 98 is spaced apart from seating surface 92 when valve 62 is in the open position (FIG. 2) to thereby allow condensate to drain through outlet 70 via gravity. When valve 62 is moved to the closed position (FIG. 3), valve seat 98 is seated against seating surface 92 and prevents condensate flow through outlet 70.

In one example, valve seat 98 is fabricated from an elastic material such as rubber. Valve seat 98 remains elastic in a range of temperatures between approximately −40° C. and approximately 85° C. or between −40° C. and 85° C. Moreover, valve seat 98 may be fabricated from a high durability and anti-corrosive material.

In the example embodiment, stopper 100 is coupled to guide rod second end 104 and is disposed outside of valve housing 60 proximate condensate outlet 70. In this way, stopper 100 at least partially covers condensate outlet 70 to facilitate preventing dust or debris from entering valve assembly 46. Moreover, stopper 100 provides an upward limit of the movement of valve 62 when stopper 100 contacts valve housing 60, for example, during a negative pressure state in charge air cooler 16.

In operation, valve assembly 46 may begin in the open position shown in FIG. 2. As the engine 12 is boosted, turbocharger 14 supplies hot compressed charge air to the charge air cooler 16 via air intake conduit 28, which increases the pressure in charge air cooler 16. This increase in pressure acts on diaphragm 96 and forces it downwards until valve seat 98 is seated against seating surface 92 and seals condensate outlet 70, thereby isolating the charge air cooler 16 from the atmosphere. During the boosted condition, the hot compressed charge air is cooled against coolant passages 48 and condensate formed therefrom is subsequently directed toward reservoir 50.

The condensate then enters valve housing 60 and collects between valve seat 98 and diaphragm 96, and/or above diaphragm 96 during the boosted condition. Once turbocharger 14 no longer provides compressed charge air to the charge air cooler 16 (e.g., engine idling, engine off, etc.) and the pressure in charge air cooler 16 approaches or reaches ambient pressure, diaphragm 96 flexes back to the flat open position (FIG. 2) and retracts valve seat 98 from seating surface 92. As such, the collected condensate is free to flow through ports 112 and out through condensate outlet 70, thereby ridding charge air cooler 16 of condensate that could corrode cooler housing 40, freeze in housing 40, and/or be drawn into the intake manifold 22 or engine 12.

Described herein are systems and methods for a valve assembly configured to drain condensate collected in a charge air cooler. The valve assembly includes a valve housing coupled to the charge air cooler, and a valve movable between an open position when the engine is not boosted and a closed position when the engine is boosted. The valve includes a diaphragm having condensate ports formed therein to drain condensate when the valve is in the open position. The diaphragm is configured to move a valve seat to a sealed position when in the engine boosted condition to prevent compressed air from leaking through the valve. Accordingly, the valve assembly isolates the charge air cooler from the ambient when in a boosted condition, and allows draining of liquid accumulated in the charge air cooler when the pressure in the valve assembly approaches the ambient pressure outside the valve assembly.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A liquid drain valve assembly for a charge air cooler, the assembly comprising:
   a valve housing configured to couple to the charge air cooler, the valve housing having a condensate inlet configured to receive condensate from the charge air cooler, and a condensate outlet; and
   a valve disposed within the valve housing, the valve including a diaphragm seated against an inner wall of the valve housing and movable between a first position enabling condensate to flow past the diaphragm and out the condensate outlet to selectively drain condensate from the charge air cooler when the charge air cooler is not in a boosted condition, and a second position preventing condensate flow out the condensate outlet when the charge air cooler is in a boosted condition to thereby isolate the charge air cooler from the atmosphere.

2. The assembly of claim 1, wherein the valve further includes a valve seat configured to selectively seal the condensate outlet.

3. The assembly of claim 2, wherein the valve further includes a guide rod at least partially extending through the condensate outlet, the diaphragm and the valve seat coupled to a first end of the guide rod.

4. The assembly of claim 3, wherein the valve further comprises a stopper coupled to a second end of the guide rod, the stopper disposed outside of the valve housing and configured to limit vertical movement of the guide rod.

5. The assembly of claim 2, wherein the valve housing includes a wall defining a seating surface, the valve seat configured to seat against the seating surface to seal the condensate outlet.

6. The assembly of claim 1, wherein the valve housing includes the inner wall having a groove formed therein, and a ring disposed in the groove configured to limit vertical deflection of an outer edge of the diaphragm.

7. The assembly of claim 1, wherein the valve housing includes a cylindrical upper portion and a frustoconical lower portion, the cylindrical upper portion configured to couple to the charge air cooler.

8. A vehicle comprising:
   an internal combustion engine;
   an air intake conduit configured to supply air to the internal combustion engine;
   a charger fluidly coupled to the air intake conduit and configured to selectively supply compressed charge air to the internal combustion engine via the air intake conduit during a boosted condition;
   a charge air cooler coupled to the air intake conduit and configured to receive the compressed charge air, the charge air cooler configured to cool the compressed charge air before the compressed charge air is supplied to the internal combustion engine; and
   a liquid drain valve assembly coupled to the charge air cooler and configured to selectively drain condensate from the charge air cooler, the liquid drain valve assembly comprising:
      a valve housing coupled to the charge air cooler, the valve housing having a condensate inlet configured to receive condensate from the charge air cooler, and a condensate outlet; and
      a valve disposed within the valve housing, the valve including a diaphragm seated against an inner wall of the valve housing and movable between a first position enabling condensate to flow past the diaphragm and out the condensate outlet when the charge air cooler is not in the boosted condition, and a second position preventing condensate flow out the condensate outlet when the charge air cooler is in the boosted condition to thereby isolate the charge air cooler from the atmosphere.

9. The vehicle of claim 8, wherein the valve housing includes a threaded inner surface configured to be threadably received by a threaded flange extending from the charge air cooler.

10. The vehicle of claim 8, wherein the charge air cooler includes a plurality of coolant passages configured to receive a coolant, the coolant passages configured to cool the compressed charge air passing thereby.

11. The vehicle of claim 8, wherein the valve further includes a valve seat configured to selectively seal the condensate outlet.

12. The vehicle of claim 11, wherein the valve further includes a guide rod at least partially extending through the condensate outlet, the diaphragm and the valve seat coupled to a first end of the guide rod.

13. The vehicle of claim 12, wherein the valve further comprises a stopper coupled to a second end of the guide rod, the stopper disposed outside of the valve housing and configured to limit vertical movement of the guide rod.

14. The vehicle of claim 11, wherein the valve housing includes a wall defining a seating surface, the valve seat configured to seat against the seating surface to seal the condensate outlet.

15. The vehicle of claim 8, wherein the inner wall is tapered and the diaphragm includes a perimeter seated on the tapered inner wall of the valve housing, and a plurality of condensate ports formed in the perimeter and configured to allow condensate to flow past the diaphragm to the condensate outlet.

16. The vehicle of claim 8, wherein the valve housing includes the inner wall having a groove formed therein, and a ring disposed in the groove configured to limit vertical deflection of an edge of the diaphragm.

17. The vehicle of claim 8, wherein the valve housing includes a cylindrical upper portion and a frustoconical lower portion, the cylindrical upper portion configured to couple to the charge air cooler.

18. A liquid drain valve assembly for a charge air cooler, the assembly comprising:
   a valve housing configured to couple to the charge air cooler, the valve housing having a condensate inlet configured to receive condensate from the charge air cooler, and a condensate outlet; and
   a valve disposed within the valve housing, the valve including a diaphragm seated against an inner wall of the valve housing and movable between a first position enabling condensate to flow past the diaphragm and out the condensate outlet to selectively drain condensate from the charge air cooler when the charge air cooler is not in a boosted condition, and a second position preventing condensate flow out the condensate outlet when the charge air cooler is in a boosted condition to thereby isolate the charge air cooler from the atmosphere,
   wherein the inner wall is tapered and the diaphragm includes a perimeter seated on the tapered inner wall of the valve housing, and a plurality of condensate ports formed in the perimeter and configured to allow condensate to flow past the diaphragm to the condensate outlet.

19. The assembly of claim 18, wherein the plurality of condensate ports formed in the diaphragm perimeter includes four condensate ports, each condensate port formed in one quadrant of the diaphragm.

\* \* \* \* \*